(12) United States Patent
Srinivasan et al.

(10) Patent No.: US 11,290,729 B2
(45) Date of Patent: Mar. 29, 2022

(54) INTRA-PREDICTION ESTIMATION USING APPROXIMATE RECONSTRUCTED SAMPLES

(71) Applicant: TEXAS INSTRUMENTS INCORPORATED, Dallas, TX (US)

(72) Inventors: Ranga Ramanujam Srinivasan, Karnataka (IN); Mahant Siddaramanna, Karnataka (IN); Naveen Srinivasamurthy, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/010,926

(22) Filed: Jun. 18, 2018

(65) Prior Publication Data

US 2018/0367804 A1    Dec. 20, 2018

Related U.S. Application Data

(63) Continuation of application No. 14/017,236, filed on Sep. 3, 2013, now abandoned.

(30) Foreign Application Priority Data

Sep. 3, 2012 (IN) .......................... 3623/CHE/2012

(51) Int. Cl.
  *H04N 19/176* (2014.01)
  *H04N 19/147* (2014.01)
  *H04N 19/11* (2014.01)

(52) U.S. Cl.
  CPC .......... *H04N 19/176* (2014.11); *H04N 19/11* (2014.11); *H04N 19/147* (2014.11)

(58) Field of Classification Search
  CPC .... H04N 19/11; H04N 19/119; H04N 19/593; H04N 19/122; H04N 19/157; H04N 19/176

(Continued)

(56) References Cited

U.S. PATENT DOCUMENTS

2004/0196903 A1*  10/2004  Kottke ............... H04N 19/147
                                                   375/240.03
2006/0177142 A1*  8/2006  Zhou .................. H04N 19/176
                                                   382/248

(Continued)

OTHER PUBLICATIONS

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.

(Continued)

*Primary Examiner* — Jeremiah C Hallenbeck-Huber
(74) *Attorney, Agent, or Firm* — Charles F. Koch; Charles A. Brill; Frank D. Cimino

(57) ABSTRACT

A method for intra-prediction estimation is provided that includes determining a best intra-prediction mode for a block of samples, wherein at least some of the neighboring samples used for intra-prediction estimation include approximate reconstructed samples, applying approximate reconstruction to the block of samples using the best intra-prediction mode to generate a block of approximate reconstructed samples, and storing the block of approximate reconstructed samples for use in intra-prediction estimation of other blocks of samples.

13 Claims, 11 Drawing Sheets

(58) Field of Classification Search
USPC .................................................. 375/240.12
See application file for complete search history.

(56) References Cited

U.S. PATENT DOCUMENTS

| | | | | |
|---|---|---|---|---|
| 2007/0250557 | A1* | 10/2007 | Gotze | H04N 19/42 708/400 |
| 2009/0245351 | A1* | 10/2009 | Watanabe | H04N 19/139 375/240.03 |
| 2010/0054331 | A1* | 3/2010 | Haddad | H04N 19/176 375/240.12 |
| 2010/0278266 | A1* | 11/2010 | Daian | H04N 19/176 375/240.15 |
| 2011/0051803 | A1* | 3/2011 | Dencher | H04N 19/176 375/240.03 |
| 2011/0051811 | A1* | 3/2011 | Wang | H04N 19/50 375/240.12 |
| 2012/0082222 | A1* | 4/2012 | Wang | H04N 19/593 375/240.12 |
| 2012/0328026 | A1* | 12/2012 | Sole Rojals | H04N 19/463 375/240.18 |
| 2013/0101036 | A1 | 4/2013 | Zhou | |
| 2013/0301712 | A1* | 11/2013 | Hsieh | H04N 19/129 375/240.08 |

OTHER PUBLICATIONS

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-217, Jul. 14-22, 2011, Torino, Italy.

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-223, Nov. 21-30, 2011, Geneva, Switzerland.

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-249, Nov. 21-30, 2011, Geneva, Switzerland.

Benjamin Bross et al, "High Efficiency Video Coding (HEVC) Text Specification Draft 7", JCTVC-I1003_d9, Joint Collaborative Team on Video Coding (JCT-VC) of ITU-T SG16 WP3 and ISO/IEC JTC1/SC29/WG11, pp. 1-260, Apr. 27-May 7, 2012, Geneva, Switzerland.

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-250, Jul. 11-20, 2012, Stockholm, Sweden.

Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/WG11, pp. 1-293, Oct. 10-19, 2012, Shanghai, China.

Benjamin Bross et al, High Efficiency Video Coding (HEVC) Text Specification Draft 10 (for FDIS & Last Call), JCTVC-L1003_v34, Joint Collaborative Team on Video Coding (JCT-VC) of ITU-T SG16 WP3 and ISO/IEC JTC1/SC29/WG11, pp. 1-298, Jan. 14-23, 2013, Geneva, Switzerland.

"TMS320DM6467 Digital Media System-on-Chip", SPRS403G, Texas Instruments Incorporated, Dec. 2007, revised Oct. 2010, pp. 1-355.

* cited by examiner

| A111 | A112 | A121 | A122 | A211 | A212 | A221 | A222 | B111 | B112 | B121 | B122 | B211 | B212 | B221 | B222 |
|---|---|---|---|---|---|---|---|---|---|---|---|---|---|---|---|
| A113 | A114 | A123 | A124 | A213 | A214 | A223 | A224 | B113 | B114 | B123 | B124 | B213 | B214 | B223 | B224 |
| A131 | A132 | A141 | A142 | A231 | A232 | A241 | A242 | B131 | B132 | B141 | B142 | B231 | B232 | B241 | B242 |
| A133 | A134 | A143 | A144 | A233 | A234 | A243 | A244 | B133 | B134 | B143 | B144 | B233 | B234 | B243 | B244 |
| A311 | A312 | A321 | A322 | A411 | A412 | A421 | A422 | B311 | B312 | B321 | B322 | B411 | B412 | B421 | B422 |
| A313 | A314 | A323 | A324 | A413 | A414 | A423 | A424 | B313 | B314 | B323 | B324 | B413 | B414 | B423 | B424 |
| A331 | A332 | A341 | A342 | A431 | A432 | A441 | A442 | B331 | B332 | B341 | B342 | B431 | B432 | B441 | B442 |
| A333 | A334 | A343 | A344 | A433 | A434 | A443 | A444 | B333 | B334 | B343 | B344 | B433 | B434 | B443 | B444 |
| C111 | C112 | C121 | C122 | C211 | C212 | C221 | C222 | D111 | D112 | D121 | D122 | D211 | D212 | D221 | D222 |
| C113 | C114 | C123 | C124 | C213 | C214 | C223 | C224 | D113 | D114 | D123 | D124 | D213 | D214 | D223 | D224 |
| C131 | C132 | C141 | C142 | C231 | C232 | C241 | C242 | D131 | D132 | D141 | D142 | D231 | D232 | D241 | D242 |
| C133 | C134 | C143 | C144 | C233 | C234 | C243 | C244 | D133 | D134 | D143 | D144 | D233 | D234 | D243 | D244 |
| C311 | C312 | C321 | C322 | C411 | C412 | C421 | C422 | D311 | D312 | D321 | D322 | D411 | D412 | D421 | D422 |
| C313 | C314 | C323 | C324 | C413 | C414 | C423 | C424 | D313 | D314 | D323 | D324 | D413 | D414 | D423 | D424 |
| C331 | C332 | C341 | C342 | C431 | C432 | C441 | C442 | D331 | D332 | D341 | D342 | D431 | D432 | D441 | D442 |
| C333 | C334 | C343 | C344 | C433 | C434 | C443 | C444 | D333 | D334 | D343 | D344 | D433 | D434 | D443 | D444 |

FIG. 2D

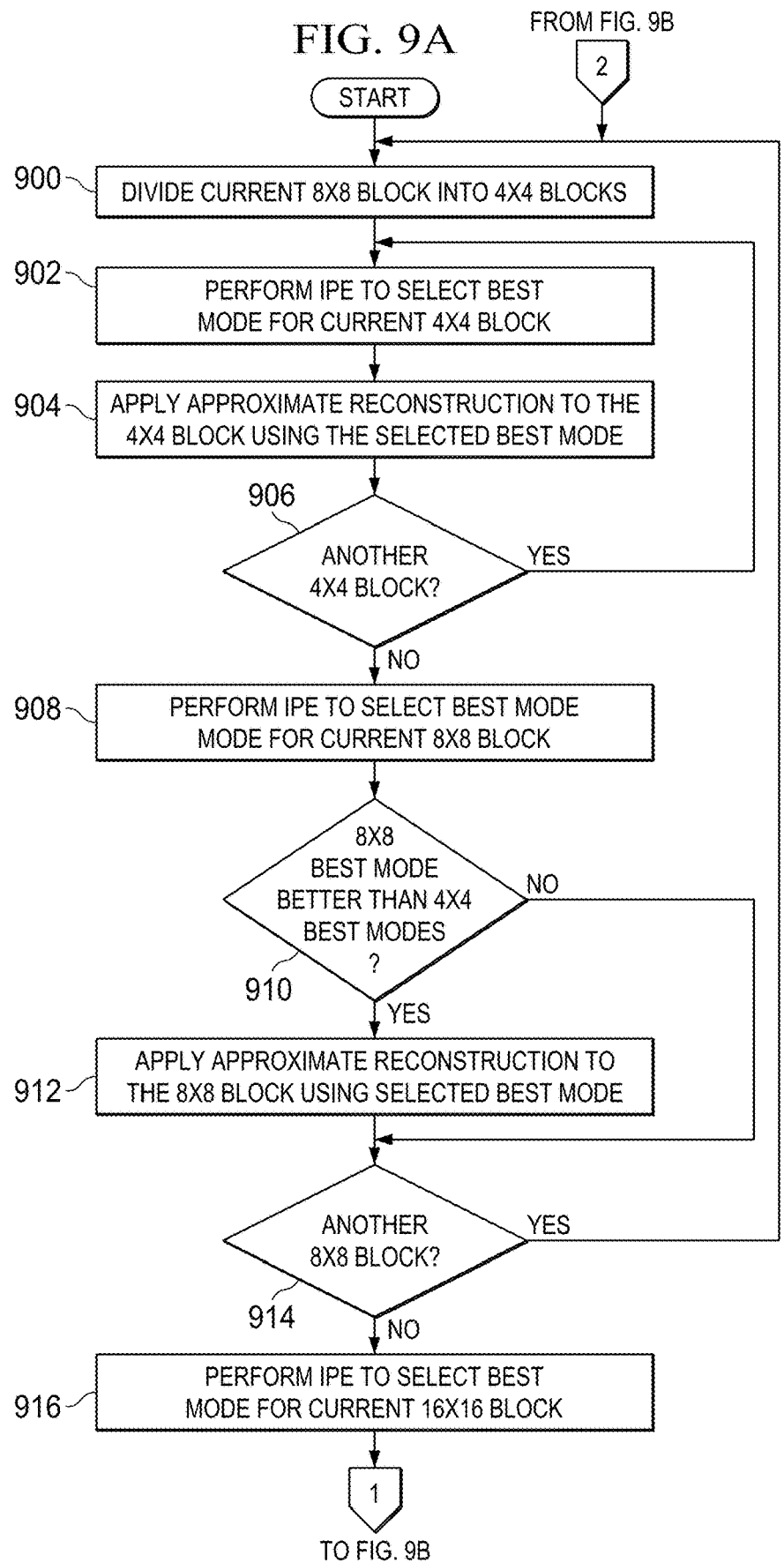

INTRA-PREDICTION ESTIMATION USING APPROXIMATE RECONSTRUCTED SAMPLES

CROSS-REFERENCE TO RELATED APPLICATIONS

This application is a continuation of U.S. patent application Ser. No. 14/017,236, filed Sep. 3, 2013, and claims the benefit of India Provisional Patent Application Serial No. 3623/CHE/2012 filed Sep. 3, 2012, the entireties of which are incorporated herein by reference.

BACKGROUND OF THE INVENTION

Field of the Invention

Embodiments of the present invention generally relate to intra-prediction estimation using approximate reconstructed samples.

Description of the Related Art

Intra prediction in video coding standards such as H.264/AVC (Advanced Video Coding), SVC (Scalable Video Coding), VP8, VP9, and HEVC (High Efficiency Video Coding) uses neighboring block reconstructed samples for predicting the current block data. Thus, it is desirable for intra prediction estimation (IPE) in the encoder to also use neighboring block reconstructed samples when selecting the best intra prediction modes for blocks. In pipelined encoder architectures, the IPE module and the module generating reconstructed samples are separate stages and are separated by a few modules. Thus, some or all of the reconstructed samples needed by the IPE module may not be available.

For example, consider a picture divided into four blocks 0, 1, 2, and 3, where block 0 is the left neighbor of block 1, block 2 is the bottom neighbor of block 0, and block 3 is the bottom neighbor of block 1. When the IPE module processes block 1, block 0 will not have been reconstructed by the reconstruction module due to the pipeline separation. Thus, any reconstructed samples from block 0 needed for IPE of block 1 are not available. Depending on the pipeline separation between the IPE module and the reconstruction module, any reconstructed samples from block 0 needed for IPE of block 2 also may not be available.

Rather than waiting for reconstructed samples to become available (and thus stalling the pipeline), IPE modules may use original samples from the current picture and/or perform sample substitution. This use of original or substituted samples can affect both the quality of the encoded video, and thus the perceptual and quantitative quality of the decoded video. For example, horizontal or directional noise artifacts can occur which may originate in I (intra-predicted) pictures and then propagate to subsequent P (predicted) and B (bi-predicted) pictures. The quality deterioration may be significantly more pronounced in HEVC as the number of blocks with unavailable reconstructed neighboring samples is larger and the number of unavailable reconstructed samples per block is larger than in prior video coding standards.

Other techniques for addressing the unavailable samples issues include true intra-prediction, an algorithm approach, and exact best intra-prediction reconstruction. In true intra-prediction, a complex block level multi-pass communication between the IPE stage and the reconstruction stage in the pipeline is used. This approach may require a large chip area and large power consumption. Further, a practical implementation may be very complex and very difficult to realize. In the algorithmic approach, original pixels may be used at the IPE stage while avoiding some intra-prediction modes prediction under certain conditions. In this approach, noise creation may occur but noise propagation may be avoided in some conditions. Further, some degradation of video quality may be caused due to not using certain prediction modes. In exact best intra-prediction reconstruction, the neighboring samples are reconstructed as part of IPE using the exact transforms and quantization specified by the video coding standard. While this approach may avoid introduction of horizontal noise and can be used for rate-distortion optimization, in a hardware implementation, the area estimate to support this approach is ~1 Million Gates for HEVC and ~600 K gates for H.264/AVC.

SUMMARY

Embodiments of the present invention relate to methods, apparatus, and computer readable media for intra-prediction estimation using approximate reconstructed samples in video coding. In one aspect, a method for intra-prediction estimation is provided that includes determining a best intra-prediction mode for a block of samples, wherein at least some of the neighboring samples used for intra-prediction estimation include approximate reconstructed samples, applying approximate reconstruction to the block of samples using the best intra-prediction mode to generate a block of approximate reconstructed samples, and storing the block of approximate reconstructed samples for use in intra-prediction estimation of other blocks of samples.

In one aspect, an apparatus configured to perform intra-prediction estimation is provided that includes means for determining a best intra-prediction mode for a block of samples, wherein at least some of the neighboring samples used for intra-prediction estimation include approximate reconstructed samples, means for applying approximate reconstruction to the block of samples using the best intra-prediction mode to generate a block of approximate reconstructed samples, and means for storing the block of approximate reconstructed samples for use in intra-prediction estimation of other blocks of samples.

In one aspect, a non-transitory computer readable medium storing software instruction is provided. The software instructions, when executed by at least one processor, cause the execution of a method for intra-prediction estimation that includes determining a best intra-prediction mode for a block of samples, wherein at least some of the neighboring samples used for intra-prediction estimation include approximate reconstructed samples, applying approximate reconstruction to the block of samples using the best intra-prediction mode to generate a block of approximate reconstructed samples, and storing the block of approximate reconstructed samples for use in intra-prediction estimation of other blocks of samples.

BRIEF DESCRIPTION OF THE DRAWINGS

Particular embodiments will now be described, by way of example only, and with reference to the accompanying drawings:

FIGS. 2A-2D are an example of intra-prediction estimation partitioning of an LCU;

FIGS. 9A and 9B are a flow diagram of a method for IPE using approximate reconstructed samples;

DETAILED DESCRIPTION OF EMBODIMENTS OF THE INVENTION

Figure 1:
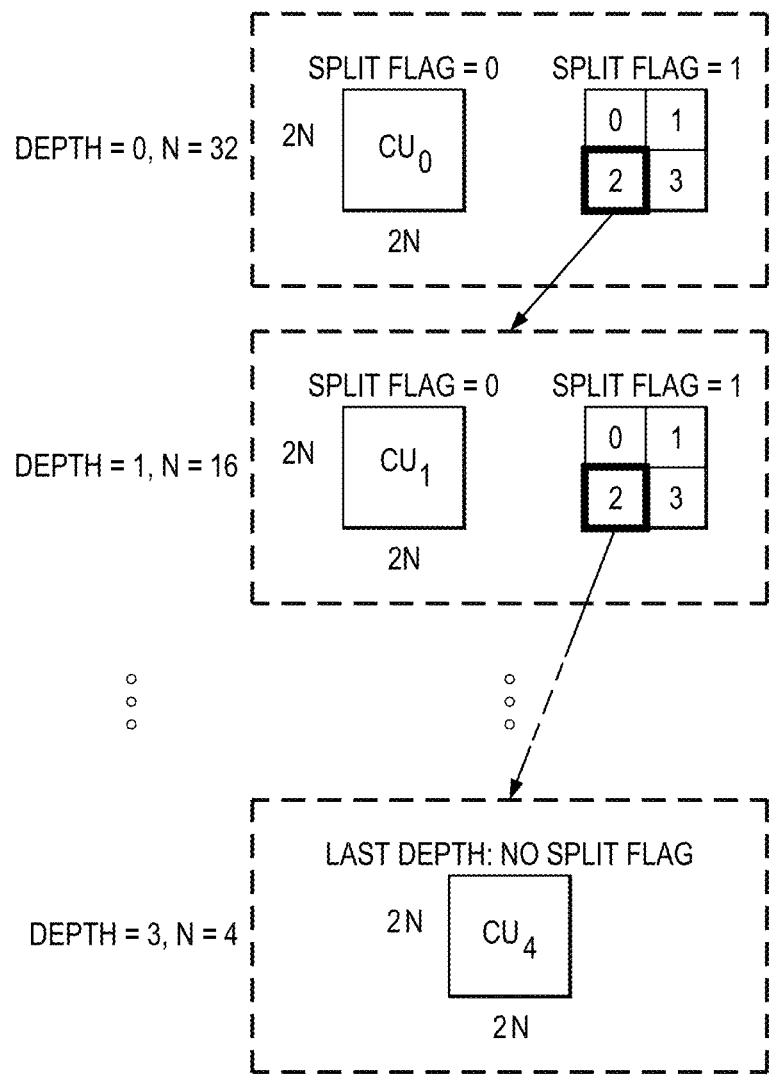
FIG. 1 is an example of quadtree based largest coding unit (LCU) decomposition.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. HEVC is the next-generation video coding standard under development by the Joint Collaborative Team on Video Coding (JCT-VC) of ITU-T WP3/16 and ISO/IEC JTC 1/SC 29/WG 11. One of ordinary skill in the art will understand that embodiments of the invention are not limited to HEVC, but may also be used for other video coding standards such as H.264/AVC.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003_dK, Joint Collaborative Team on Video Coding (JCT-VC) of ITU-T SG16 WP3 and ISO/IEC JTC1/SC29/WG1, San Jose, Calif., Feb. 1-10, 2012, ("HEVC Draft 6"), B. Bross, et al., "High Efficiency Video Coding (HEVC) Text Specification Draft 7," JCTVC-I1003_d9, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), B. Bross, et al., "High Efficiency Video Coding (HEVC) Text Specification Draft 9," JCTVC-K1003_v13, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9"), and B. Bross, et al., "High Efficiency Video Coding (HEVC) Text Specification Draft 10 (for FDIS & Last Call)," JCTVC-L1003_v34, Joint Collaborative Team on Video Coding (JCT-VC) of ITU-T SG16 WP3 and ISO/IEC JTC1/SC29/WG1, Geneva, CH, Jan. 14-23, 2013 ("HEVC Draft 10").

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU) using recursive quadtree partitioning. A CU is a block of pixels within an LCU and the CUs within an LCU may be of different sizes. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

FIG. 1 shows an example of CU partitioning in which the LCU size is 64×64 and the maximum hierarchical depth is 3. The recursive structure, i.e., the partitioning, is represented by a series of split flags. For $CU_d$, which has depth d and size 2N×2N, the coding of the CU is performed in the current depth when split flag is set to zero. When the split flag is set to 1, $CU_d$ is split into 4 independent $CU_{d+1}$ which have depth (d+1) and size N×N. In this case, $CU_{d+1}$ is referred to as a sub-CU of $CU_d$. Unless the depth of sub-CU (d+1) is equal to the maximum allowed depth, each $CU_{d+1}$ is processed in a recursive manner. If the depth of sub-CU (d+1) is equal to the maximum allowed depth, further splitting is not allowed. For coding, a CU can be further split into PUs and TUs. The sizes of an LCU and SCU are specified in the Sequence Parameter Set (SPS). The embedded information in the SPS is LCU size (s) and the maximum hierarchical depth (h) in a LCU. For example, if s=64 and h=4, then 4 CU sizes are possible: 64×64 (LCU), 32×32, 16×16 and 8×8 (SCU). If s=16 and h=2, then 16×16 (LCU) and 8×8 (SCU) are possible.

In some encoders, determination of the best CU structure and the best prediction mode (intra or inter) for a CU is performed bottom up, i.e., starting with the smallest possible CU partitioning and working up the hierarchy levels. More specifically, for each CU of each CU size, starting with the smallest CU size, the encoder determines an intra-prediction coding cost for the CU, the best PU partition type for the CU, and an intra-prediction mode for each PU of the best partition type. To determine the best PU partition type and the intra-prediction modes for the PUs of the best PU partition type, the encoder partitions the CU into PUs according to HEVC-specified PU partition types for intra-prediction of a CU of the CU size. Tests are performed on each PU of a PU partition type according to intra-prediction modes specified for the PU size to choose the best intra-prediction mode for each PU based on coding costs of these modes. HEVC defines 35 intra-prediction modes that apply to all PU sizes. For intra-prediction, a CU has only one PU, i.e., CU=PU, except for the smallest CU size (SCU). CUs of the smallest CU size may be split into four PUs. In this latter case, each PU may have a different intra-prediction mode.

Figures 2A, 2B, 2C:
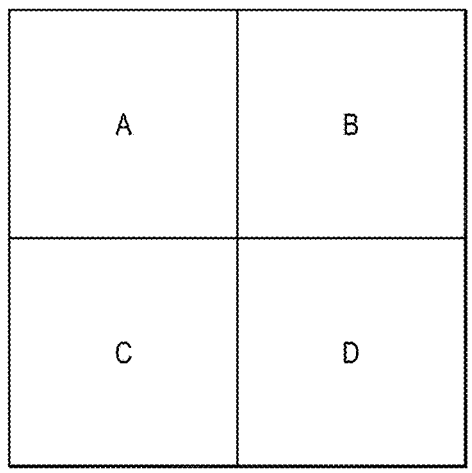

For example, assume a 64×64 LCU and a hierarchy depth of 3. Thus, the smallest CU size is 8×8. FIGS. 2A-2C illustrate, respectively, the partitioning of a 64×64 LCU into 32×32 CUs, the 32×32 CUs into 16×16 CUs, and the 16×16 CUs into 8×8 CUs. FIG. 2D illustrates the partitioning of the 8×8 CUs into 4×4 PUs. To determine the best intra-prediction mode for all allowed partitionings of a 64×64 LCU, all 35 intra-prediction modes are tested for each of the 256 4×4 blocks (PUs) of FIG. 2D, each of the 64 8×8 blocks (CU/PU) of FIG. 2C, each of the 16 16×16 blocks (CU/PU) of FIG. 2B, each of the four 32×32 blocks (CU/PU) of FIG. 2A, and for the 64×64 block (PU/LCU).

Of the 35 intra-prediction modes, 33 are block-based angular intra-prediction (BAP) modes. Block-based angular intra-prediction (BAP) is defined to exploit spatial sample redundancy in intra-coded CUs. In general, BAP predicts each sample within a PU based on reference samples around the upper and left borders of the PU. The particular two boundary reference samples used for prediction of a sample are selected according to a prediction angle selected for the PU.

Figure 3:
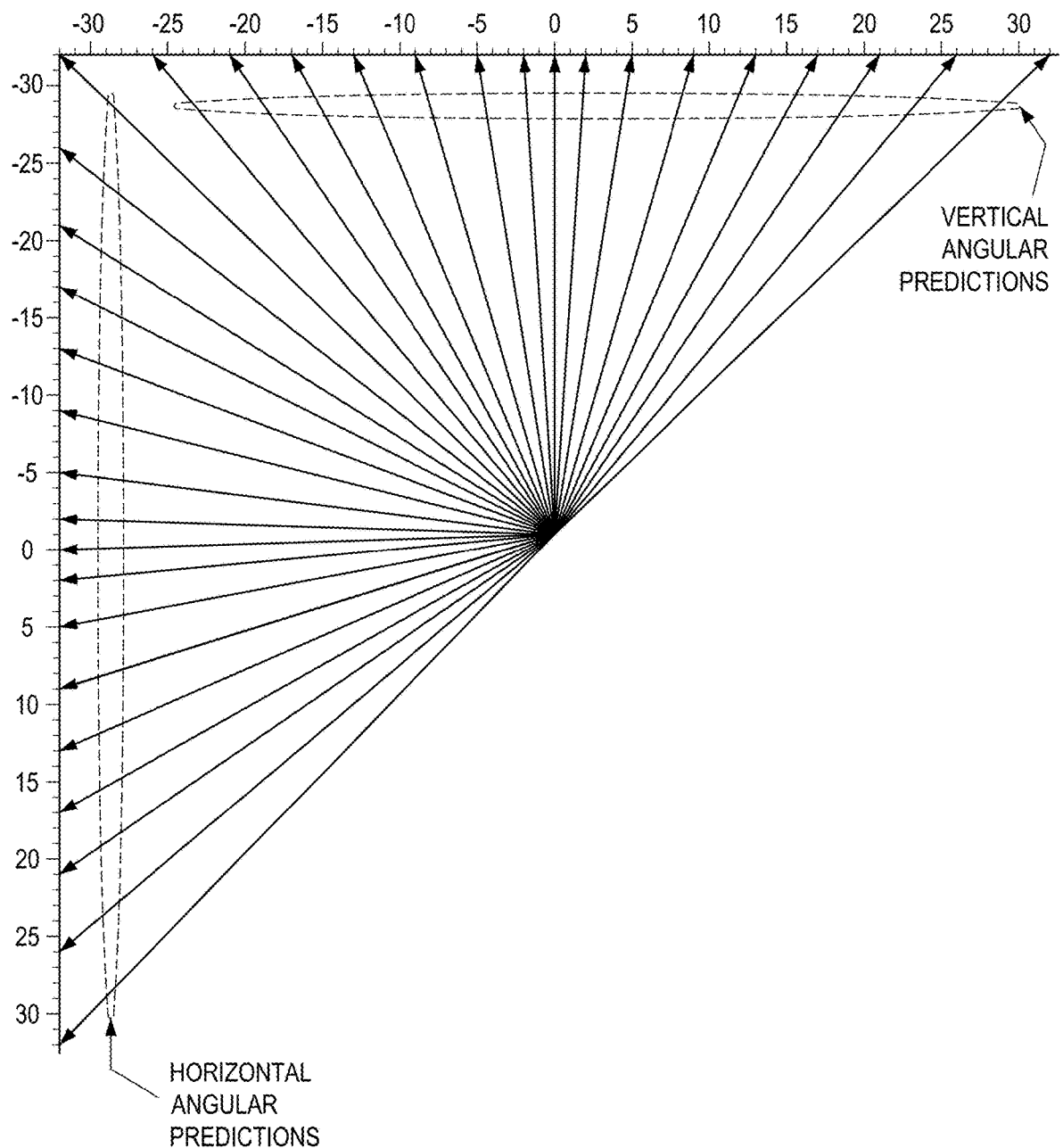
FIG. 3 is an example illustrating prediction angles for angular intra-prediction.

As illustrated in FIG. 3, the 33 angles for the 33 block-based angular intra-prediction modes are +/−[0, 2, 5, 9, 13, 17, 21, 26, 32]/32. The prediction angles are given by the displacement of the bottom row of the PU and the top neighboring reference row above the PU for vertical prediction, or the displacement of the rightmost column of the PU and the left neighboring reference column of the PU for horizontal prediction. Table 1 shows the mode identifier for each of the angular intra-prediction modes and the associated intra-prediction angle. These angles can be categorized into two classes: horizontal and vertical. Modes 2-18 are the horizontal angular intra-prediction modes and modes 19-34 are the vertical angular intra-prediction modes.

distance between p and b. The numerical values 32, 16, and 5 are used since 5-bit precision, i.e., 1/32 pixel precision, is used for representing an intra-prediction angle. If the intra-prediction angle is a vertical angle, $$iFact=((y+1)*intraPredAngle)\& 31 \quad (2)$$

and if the intra-prediction angle is a horizontal angle, $$iFact=((x+1)*intraPredAngle)\& 31 \quad (3)$$

where intraPredAngle is the intra-prediction angle value (see Table 1), and x and y are the coordinates of the sample in the PU for which the prediction sample is to be generated. The upper-left corner sample of the PU has coordinates of x=0 and y=0. Further, if iFact=0, p=a and if iFact=32, p=b.

As previously mentioned, in pipelined encoder architectures, the IPE module selecting the best intra-prediction modes and the module generating reconstructed samples are separate stages and are separated by a few modules. Thus, some or all of the reconstructed samples needed by the IPE module may not be available. In HEVC, the block granularity in a pipelined encoder architecture may be an LCU, i.e., a video sequence is processed LCU by LCU through the pipelined encoding modules. In such architectures, the top and left neighboring reference (reconstructed) samples for most PUs of an LCU may not be available. For example, referring to the example of FIGS. 2A-2D, top and left neighboring reference samples are not available for most of the interior blocks of FIGS. 2B, 2C, and 2D.

Figure 6:
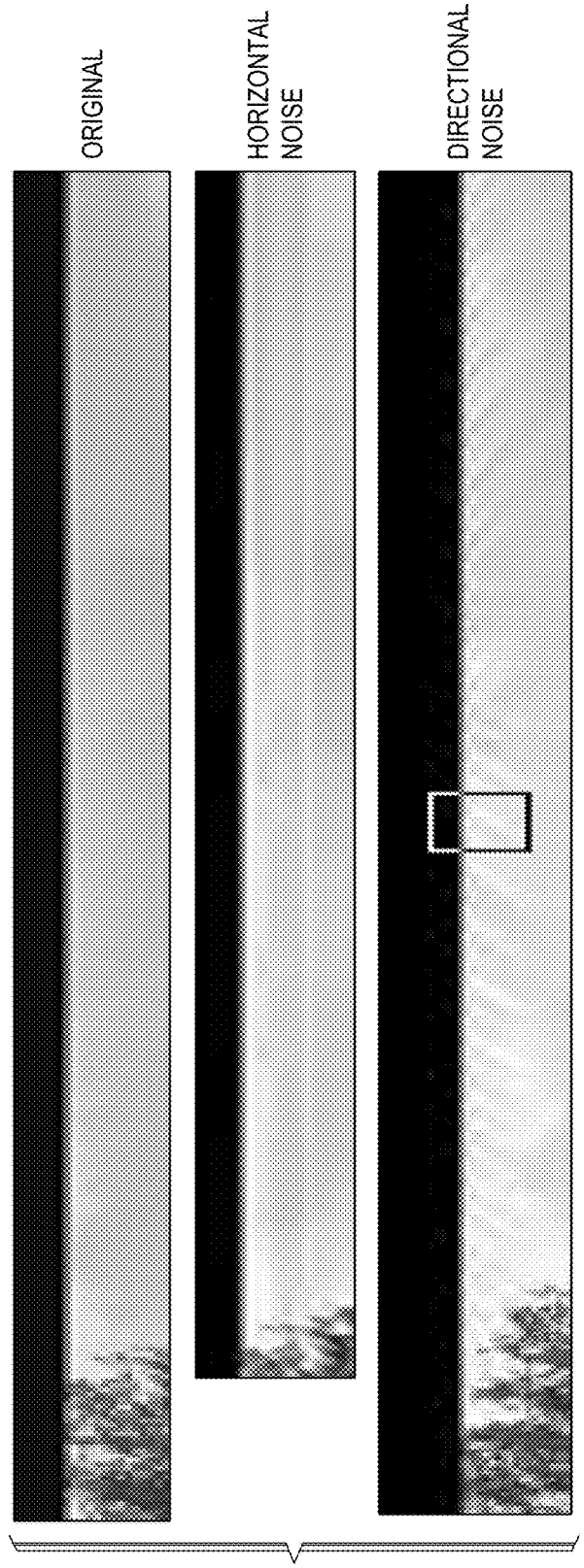
FIG. 6 is an example illustration horizontal and directional noise caused by use of original samples in lieu of unavailable reconstructed samples for intra-prediction estimation (IPE)

As previously described, an encoder may perform sample substitution and/or use the original neighboring samples corresponding to the unavailable reconstructed samples to provide values for the unavailable reference samples. However, this may affect the quality of the resulting encoded video, and the decoded video by introducing horizontal or directional noise artifacts. FIG. 6 is an example illustrating the effect of using original samples in lieu of the corresponding unavailable reconstructed samples for the reference samples in IPE. The top image shows the original video picture. The middle image shows a case in which a hori-

TABLE 1

| Mode | 2 | 3 | 4 | 5 | 6 | 7 | 8 | 9 | 10 | 11 | 12 |
|---|---|---|---|---|---|---|---|---|---|---|---|
| intraPredAngle | 32 | 26 | 21 | 17 | 13 | 9 | 5 | 2 | 0 | −2 | −5 |
| Mode | 13 | 14 | 15 | 16 | 17 | 18 | 19 | 20 | 21 | 22 | 23 |
| intraPredAngle | −9 | −13 | −17 | −21 | −26 | −32 | −26 | −21 | −17 | −13 | −9 |
| Mode | 24 | 25 | 26 | 27 | 28 | 29 | 30 | 31 | 32 | 33 | 34 |
| intraPredAngle | −5 | −2 | 0 | 2 | 5 | 9 | 13 | 17 | 21 | 26 | 32 |

Figure 4:
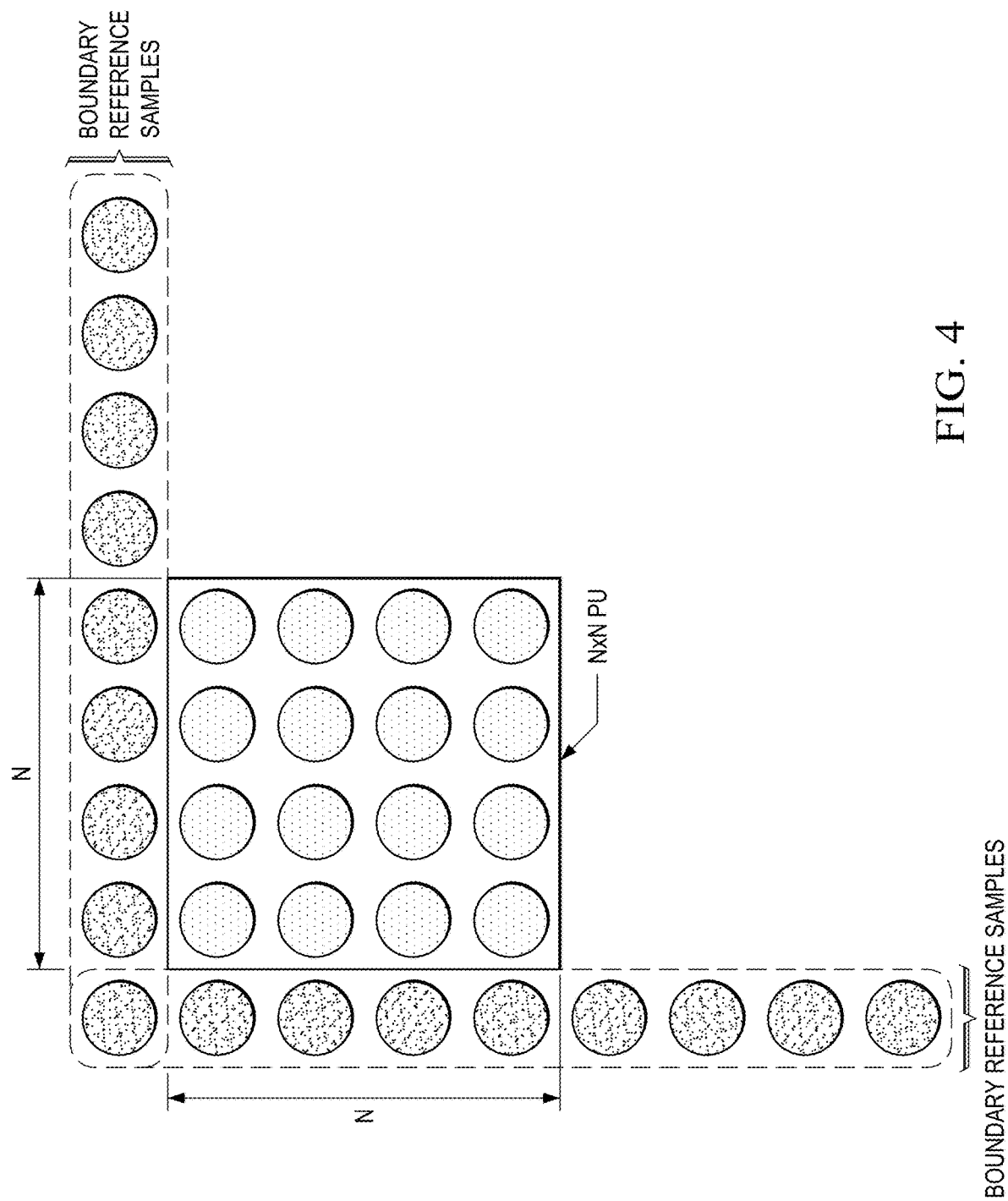
FIG. 4 is an example illustrating reference samples for angular Intra-prediction.
Figure 5:
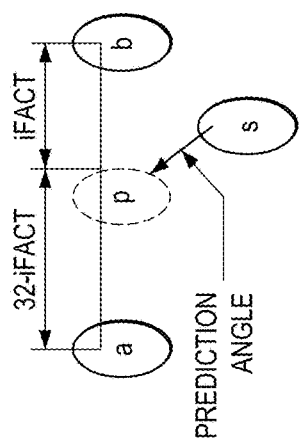
FIG. 5 is an example illustrating computation of a predicted sample using angular intra-prediction.

All samples in a PU of a CU share the same prediction angle. As shown in FIG. 4, for an N×N PU, BAP involves a total of 4N+1 boundary reference samples from left and upper neighboring PUs. Sample substitution may be performed to provide values for any unavailable boundary reference samples or the original samples corresponding to the unavailable reference samples may be used. FIG. 5 shows a pictorial representation of the computation of a prediction sample for a sample in a PU. For each sample in a PU, two boundary reference samples are selected based on the location of the sample in the PU and the prediction angle. Once the boundary reference samples are determined, the prediction sample is generated using linear interpolation defined as $$p=((32-iFact)*a+iFact*b+16)>>5 \quad (1)$$

where a and b are the boundary reference samples selected for the sample s, p is the prediction sample, and iFact is the zontal artifact is introduced due to use of original samples in lieu of unavailable reconstructed samples. The bottom image shows a more severe case in which directional artifacts are introduced due to use of original samples in lieu of unavailable reconstructed samples. Note that the sky region is completely distorted.

Embodiments of the invention provide for intra-prediction estimation (IPE) for PUs in which approximate reconstructed samples are substituted for at least some of the unavailable reconstructed neighboring samples. The approximate reconstructed samples are generated as part of IPE using simplified transforms and simplified quantization (and their inverses), i.e., rather than using the transforms and quantization specified by HEVC, simpler versions are used that provided approximately the same results as the specified versions with less computational complexity. Using the approximate reconstructed samples for IPE appears to provide better perceptual quality than using original samples as no horizontal or directional artifacts were seen in tests performed using an HEVC encoder.

Figure 7:
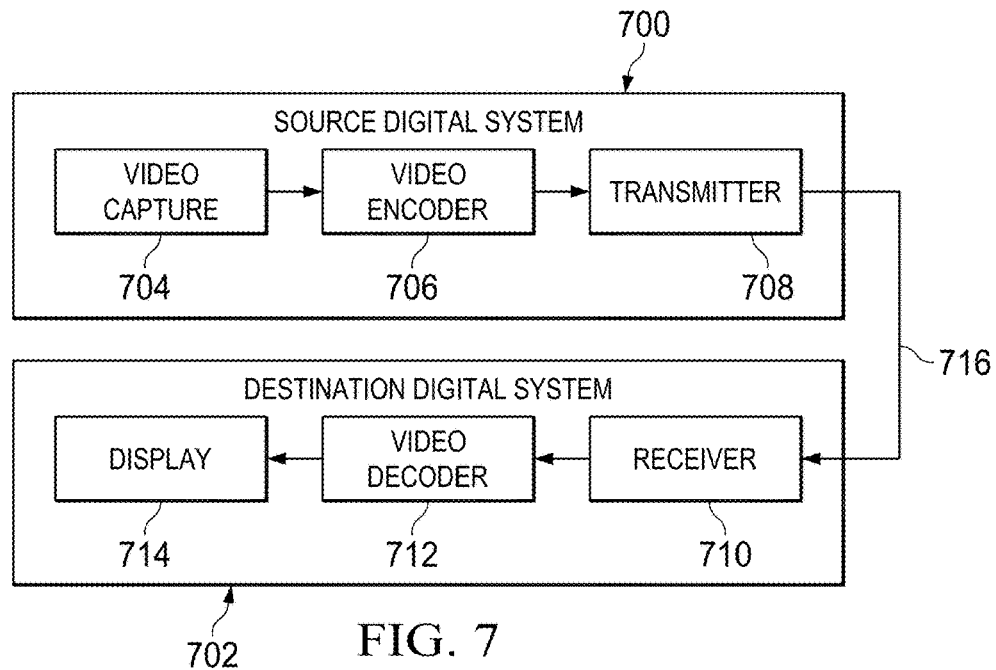
FIG. 7 is a block diagram of a digital system.

FIG. 7 shows a block diagram of a digital system that includes a source digital system 700 that transmits encoded video sequences to a destination digital system 702 via a communication channel 716. The source digital system 700 includes a video capture component 704, a video encoder component 706, and a transmitter component 708. The video capture component 704 is configured to provide a video sequence to be encoded by the video encoder component 706. The video capture component 704 may be, for example, a video camera, a video archive, or a video feed from a video content provider. In some embodiments, the video capture component 704 may generate computer graphics as the video sequence, or a combination of live video, archived video, and/or computer-generated video.

The video encoder component 706 receives a video sequence from the video capture component 704 and encodes it for transmission by the transmitter component 708. The video encoder component 706 receives the video sequence from the video capture component 704 as a sequence of pictures, divides the pictures into largest coding units (LCUs), and encodes the video data in the LCUs. As part of the encoding process, the video encoder component 706 may perform intra-prediction estimation using approximate reconstructed samples as described herein. An embodiment of the video encoder component 706 is described in more detail herein in reference to FIG. 8.

The transmitter component 708 transmits the encoded video data to the destination digital system 702 via the communication channel 716. The communication channel 716 may be any communication medium, or combination of communication media suitable for transmission of the encoded video sequence, such as, for example, wired or wireless communication media, a local area network, or a wide area network.

The destination digital system 702 includes a receiver component 710, a video decoder component 712 and a display component 714. The receiver component 710 receives the encoded video data from the source digital system 700 via the communication channel 716 and provides the encoded video data to the video decoder component 712 for decoding. The video decoder component 712 reverses the encoding process performed by the video encoder component 706 to reconstruct the LCUs of the video sequence.

The reconstructed video sequence is displayed on the display component 714. The display component 714 may be any suitable display device such as, for example, a plasma display, a liquid crystal display (LCD), a light emitting diode (LED) display, etc.

In some embodiments, the source digital system 700 may also include a receiver component and a video decoder component and/or the destination digital system 702 may include a transmitter component and a video encoder component for transmission of video sequences both directions for video steaming, video broadcasting, and video telephony. Further, the video encoder component 706 and the video decoder component 712 may perform encoding and decoding in accordance with one or more video compression standards. The video encoder component 706 and the video decoder component 712 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 8:
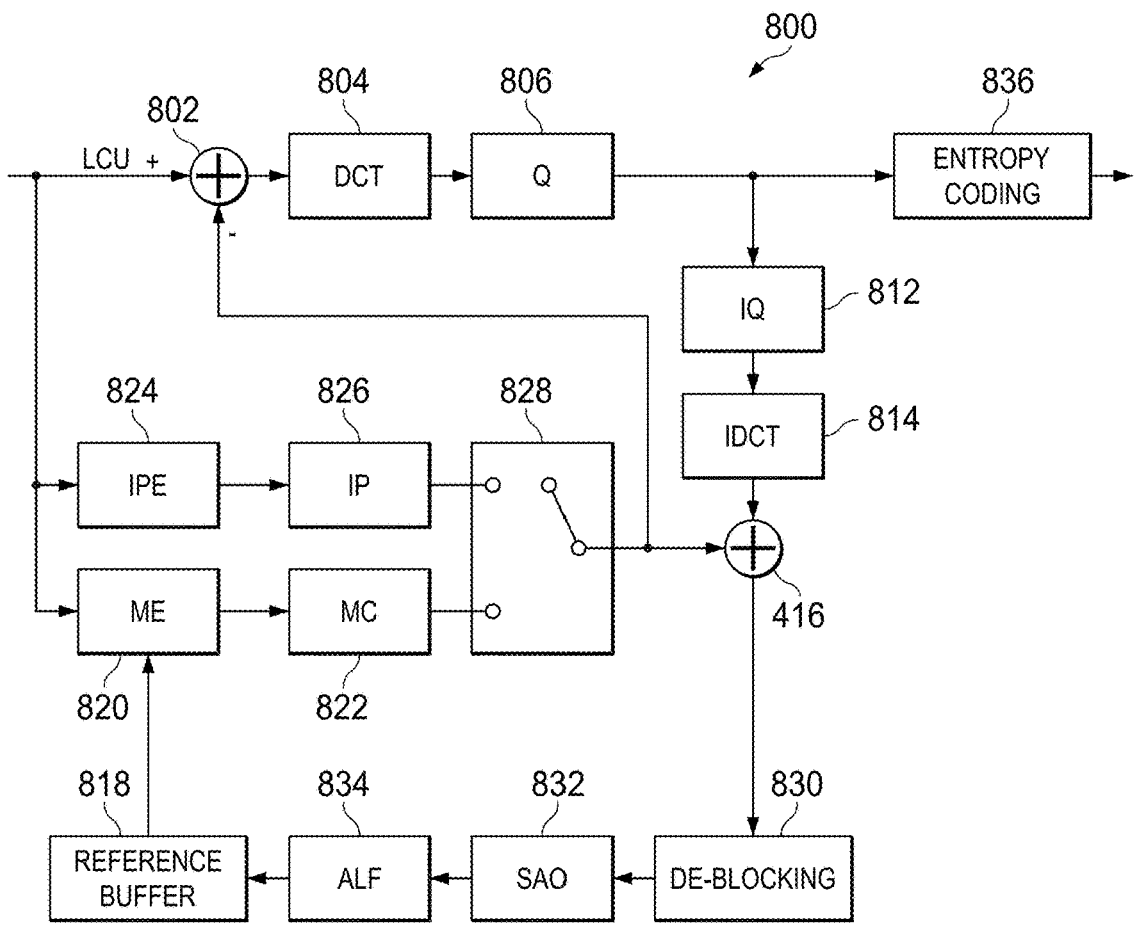
FIG. 8 is a block diagram of a video encoder.

FIG. 8 is a block diagram of the LCU processing component of an example video encoder, e.g., the video encoder component 706 of FIG. 7. An input digital video sequence is provided to a coding control component (not shown). The coding control component sequences the various operations of the video encoder, i.e., the coding control component runs the main control loop for video encoding. For example, the coding control component performs processing on the input video sequence that is to be done at the picture level, such as determining the coding type (I, P, or B) of a picture based on a high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to offload certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs 800 of the input video sequence from the coding control component and encodes the LCUs 800 under the control of the coding control component to generate the compressed video stream. The LCUs 800 in each picture are processed in row order. The LCUs 800 from the coding control component are provided as one input of a motion estimation component (ME) 820, as one input of an intra-prediction estimation component (IPE) 824, and to a positive input of a combiner 802 (e.g., adder or subtractor or the like). Further, although not specifically shown, the prediction mode of each picture as selected by the coding control component is provided to a mode decision component 828 and the entropy coding component 836.

The storage component 818 provides reference data to the motion estimation component 820 and to the motion compensation component 822. The reference data may include one or more previously encoded and decoded pictures, i.e., reference pictures.

The motion estimation component 820 provides motion data information to the motion compensation component 822 and the entropy coding component 836. More specifically, the motion estimation component 820 performs tests on CUs in an LCU based on multiple inter-prediction modes (e.g., skip mode, merge mode, and normal or direct inter-prediction), PU sizes, and TU sizes using reference picture data from storage 818 to choose the best CU partitioning, PU/TU partitioning, inter-prediction modes, motion vectors, etc. based on coding cost, e.g., a rate distortion coding cost. To perform the tests, the motion estimation component 820 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 820 provides the motion vector (MV) or vectors and the prediction mode for each PU in the selected CU partitioning to the motion compensation component (MC) 822.

The motion compensation component 822 receives the selected inter-prediction mode and mode-related information from the motion estimation component 820 and generates the inter-predicted CUs. The inter-predicted CUs are provided to the mode decision component 828 along with the selected inter-prediction modes for the inter-predicted PUs and corresponding TU sizes for the selected CU/PU/TU partitioning. The coding costs of the inter-predicted CUs are also provided to the mode decision component 828.

The intra-prediction estimation component 824 (IPE) performs intra-prediction estimation in which tests on CUs in an LCU based on multiple intra-prediction modes, PU sizes, and TU sizes to choose the best CU partitioning, PU/TU partitioning, and intra-prediction modes based on coding cost, e.g., a rate distortion coding cost. The tests perform intra-prediction for each mode using reconstructed samples from previously encoded neighboring CUs when available and/or approximate reconstructed samples (when available) from neighboring CUs or PUs that replace at least some of the unavailable reconstructed samples and/or other sample substitution (such as using original pixels) to replace any of the unavailable reconstructed samples that cannot be replaced with approximate reconstructed samples. A method for IPE using approximate reconstructed samples is described below in reference to FIGS. 9A and 9B.

In general, to perform the tests, the intra-prediction estimation component 824 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 824 provides the selected intra-prediction modes for the PUs, and the corresponding TU sizes for the selected CU partitioning to the intra-prediction component (IP) 826. The coding costs of the intra-predicted CUs are also provided to the intra-prediction component 826.

The intra-prediction component 826 (IP) receives intra-prediction information, e.g., the selected mode or modes for the PU(s), the PU size, etc., from the intra-prediction estimation component 824 and generates the intra-predicted CUs. The intra-predicted CUs are provided to the mode decision component 828 along with the selected intra-prediction modes for the intra-predicted PUs and corresponding TU sizes for the selected CU/PU/TU partitioning. The coding costs of the intra-predicted CUs are also provided to the mode decision component 828.

The mode decision component 828 selects between intra-prediction of a CU and inter-prediction of a CU based on the intra-prediction coding cost of the CU from the intra-prediction component 826, the inter-prediction coding cost of the CU from the motion compensation component 822, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 836.

The output of the mode decision component 828, i.e., the predicted PUs, is provided to a negative input of the combiner 802 and to the combiner 838. The associated transform unit size is also provided to the transform component 804. The combiner 802 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 804 performs block transforms on the residual CUs to convert the residual pixel values to transform coefficients and provides the transform coefficients to a quantize component 806. More specifically, the transform component 804 receives the transform unit sizes for the residual CU and applies transforms of the specified sizes to the CU to generate transform coefficients. Further, the quantize component 806 quantizes the transform coefficients based on quantization parameters (QPs) and quantization matrices provided by the coding control component and the transform sizes and provides the quantized transform coefficients to the entropy coding component 836 for coding in the bit stream.

The entropy coding component 836 entropy encodes the relevant data, i.e., syntax elements, output by the various encoding components and the coding control component to generate the compressed video bit stream. Among the syntax elements that are encoded are picture parameter sets, flags indicating the CU/PU/TU partitioning of an LCU, the prediction modes for the CUs, and the quantized transform coefficients for the CUs.

The LCU processing component 842 includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 812, which outputs a reconstructed version of the transform result from the transform component 804. The dequantized transform coefficients are provided to the inverse transform component (IDCT) 814, which outputs estimated residual information representing a reconstructed version of a residual CU. The inverse transform component 814 receives the transform unit size used to generate the transform coefficients and applies inverse transform(s) of the specified size to the transform coefficients to reconstruct the residual values. The reconstructed residual CU is provided to the combiner 838.

The combiner 838 adds the original predicted CU to the residual CU to generate a reconstructed CU, which becomes part of reconstructed picture data. The reconstructed picture data is stored in a buffer (not shown) for use by the intra-prediction estimation component 824.

Various in-loop filters may be applied to the reconstructed coded picture data to improve the quality of the reference picture data used for encoding/decoding of subsequent pictures. The in-loop filters may include a deblocking filter 830, a sample adaptive offset filter (SAO) 832, and an adaptive loop filter (ALF) 834. In some embodiments, the ALF 834 may not be present. The various in-loop filters may be applied on an LCU-by-LCU basis and the final filtered reference picture data is provided to the storage component 818.

Figure 9B:
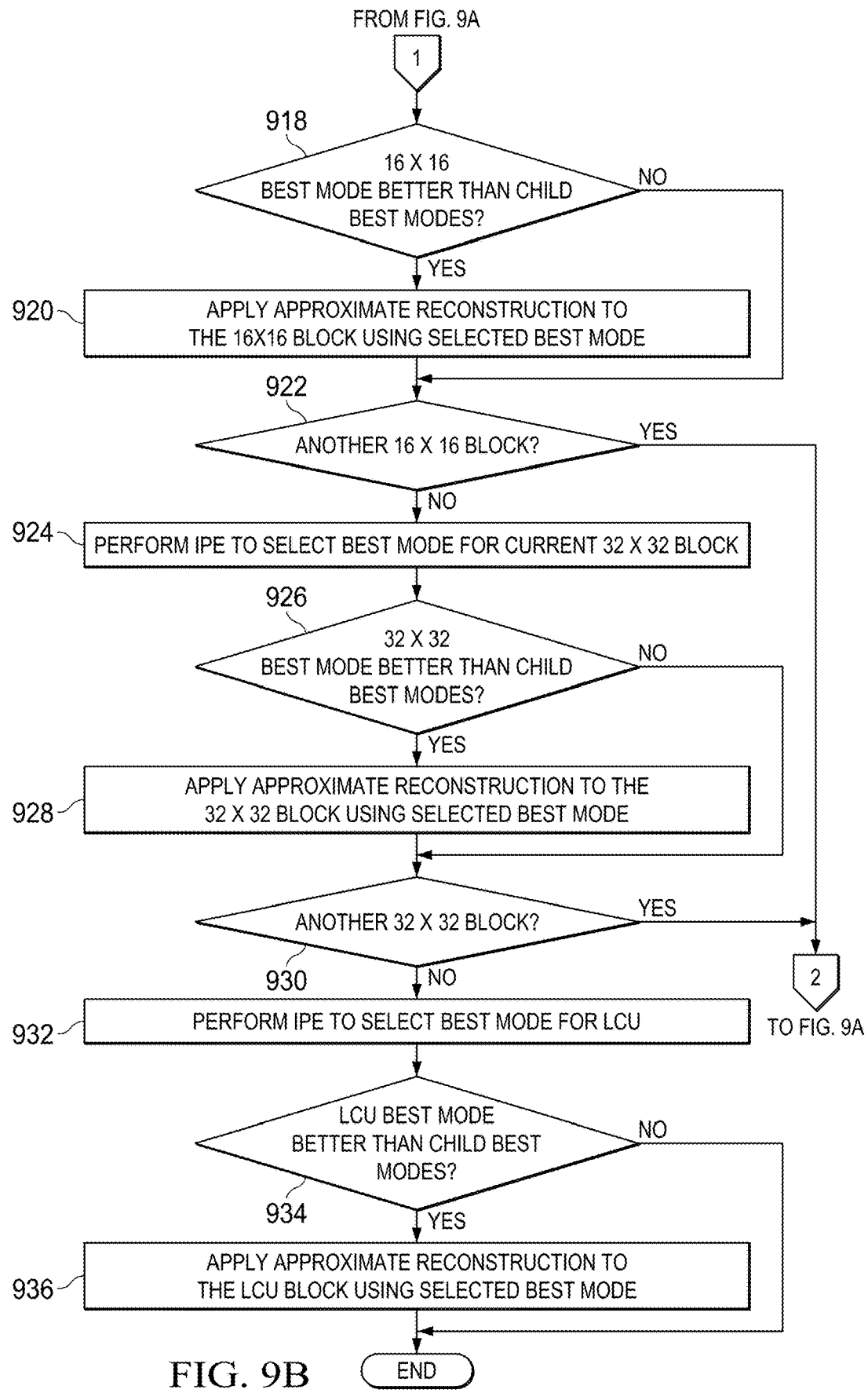

FIGS. 9A and 9B are a flow diagram of a method for intra-prediction estimation (IPE) of an LCU using approximate reconstructed samples that may be performed, for example, by the intra-prediction estimation component 824 of the video encoder of FIG. 8. This method may be used for both luminance and chrominance components. For simplicity of explanation, the method assumes a 64×64 LCU and is explained with reference to the example of FIGS. 2A-2D. One of ordinary skill in the art, having benefit of the description herein, will understand embodiments in which other block sizes and/or block partitionings are used. First, approximate reconstruction is explained and then the method is explained.

Figure 10:
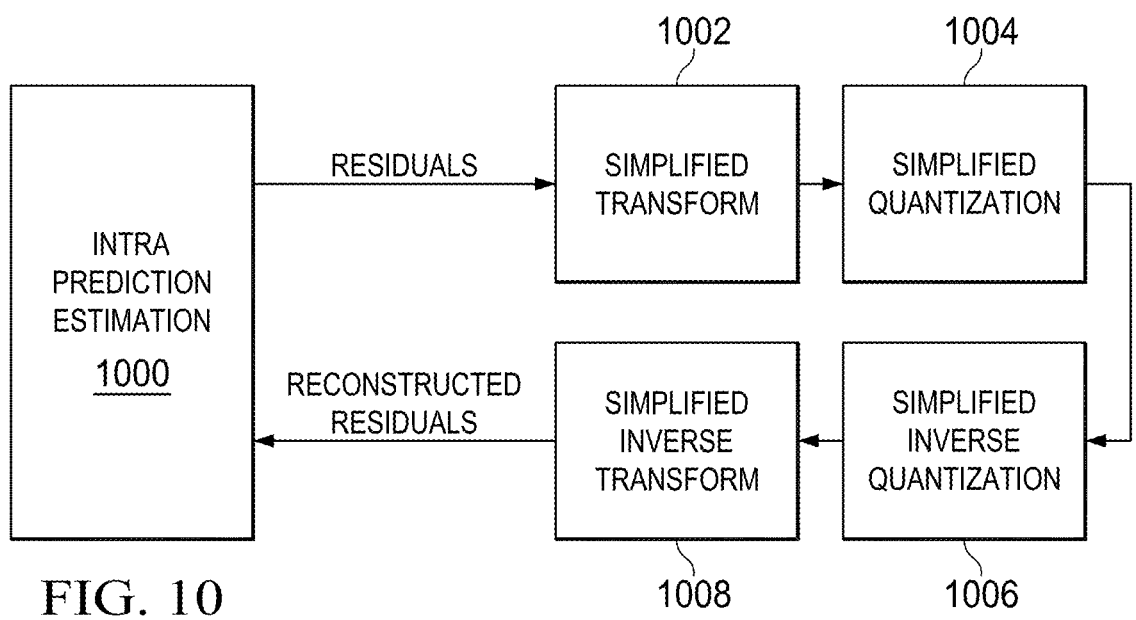
FIG. 10 is a block diagram illustrating approximate reconstruction.

In general, approximate reconstructed samples are generated for a block of original samples once intra-prediction estimation (IPE) has been applied to the block to select a best intra-prediction mode. FIG. 10 illustrates the flow of approximate reconstruction. Note that the flow is similar to that followed by an encoder to generated reconstructed samples. However, the complexity is reduced by using a simplified transform and simplified quantization. That is, rather than using the transforms and quantization specified by HEVC, simpler versions are used in the reconstruction process that produce approximate reconstructed samples. To generate the approximate reconstructed samples, the samples in the block are predicted 1000 using the selected intra-prediction mode. The predicted block is then subtracted from the original block to generate a block of residual values. A simplified transform 1002 is then applied to the block of residuals to convert the residuals to transform coefficients, and simplified quantization 1004 is then applied to the transform coefficients. Inverse quantization 1106 is then applied to the quantized transform coefficients to recover the transform coefficients. The inverse of the simplified transform 1008 is then applied to the dequantized coefficients to produce reconstructed residuals. The predicted block is then added to the reconstructed residual block to generate a block of approximate reconstructed samples that may then be stored to be used for IPE of neighboring blocks.

Any suitable simplified transform or transforms and any suitable simplified quantization may be used in embodiments. Suitable simplified transforms and/or simplified quantization may be determined empirically. Suitable simplified transforms eliminate the need for multiplication in applying the transforms, i.e., only add, subtract and shift operations are needed. Some examples of simplified transforms and simplified quantization that may be used are now described.

Suitable simplified 4×4 and 8×8 transforms may be derived from the discrete cosine transforms (DCTs) of the same size. Shown below are the basis vectors of a 4×4 DCT in floating point precision:

{0.5, 0.5, 0.5, 0.5}
{0.6532, 0.2706, −0.2706, −0.6532}
{0.5, −0.5, −0.5, 0.5}
{0.2706, −0.6532, 0.6532, −0.2706}.

As is well known, floating point basis vectors are very complex to implement and are typically converted to fixed point. Shown below are the basis vectors of the 4×4 HEVC transform which are obtained by multiplying the above DCT basis vectors by 128:

{64, 64, 64, 64}
{83, 36, −36, −83}
{64, −64, −64, 64}
{36, −83, 83, −36}.

Thus, the basis vectors of the HEVC transform have an almost equal norm (=~128) but multiplication is required.

A suitable simplified 4×4 transform that eliminates the need for multiplication and can be implemented with shift, add, and subtract operations may be obtained by multiplying the DCT coefficients by 4 and flooring the resulting values. The basis vectors of the resulting simplified 4×4 transform, shown below, have an almost equal norm of 4:

{2, 2, 2, 2}
{3, 1, −1, −3}
{2, −2, −2, 2}
{1, −3, 3, −1}.

Similarly, a suitable simplified 8×8 transform that eliminates the need for multiplication and can be implemented with shift, add, and subtract operations may be obtained by multiplying the DCT coefficients by 6 and flooring the resulting values. The basis vectors of the resulting simplified 8×8 transform, shown below, have an almost equal norm of (sqrt(32)):

{2, 2, 2, 2, 2, 2, 2, 2}
{3, 2, 2, 1, −1, −2, −2, −3}
{3, 1, −1, −3, −3, −1, 1, 3}
{2, −1, −3, −2, 2, 3, 1, −2}
{2, −2, −2, 2, 2, −2, −2, 2}
{2, −3, 1, 2, −2, −1, 3, −2}
{1, −3, 3, −1, −1, 3, −3, 1}
{1, −2, 2, −3, 3, −2, 2, −1}.

Hadamard transforms are also suitable simplified transforms that may be used. The basis vectors of a 4×4 Hadamard transform, shown below, have an almost equal norm of 2:

{1, 1, 1, 1}
{1, 1, −1, −1}
{1, −1, 1, −1}

The basis vectors of an 8×8 Hadamard transform, shown below, have an almost equal norm of (sqrt(8)):

{1, 1, 1, 1, 1, 1, 1, 1}
{1, 1, 1, 1, −1, −1, −1, −1}
{1, 1, −1, −1, −1, −1, 1, 1}
{1, −1, −1, −1, 1, 1, 1, −1}
{1, −1, −1, 1, 1, −1, −1, 1}
{1, −1, 1, 1, −1, −1, 1, −1}
{1, −1, 1, −1, −1, 1, −1, 1}
{1, −1, 1, −1, 1, −1, 1, −1}.

Forward quantization in HEVC is implemented as level=(coeff*$Q$+offset)>>(14+QP/6)

and the inverse is implemented as coeff$Q$=(level*IQ<<(QP/6))>>6 where the value of Q or IQ is selected from Table 2. Note that forward quantization involves a right shift of 14 and inverse quantization involves a right shift of 6.

TABLE 2

| Qp | Quantization multiplier Current values (Q) | Inverse quantization multiplier Current values (IQ) |
|---|---|---|
| 0 | 26214 | 40 |
| 1 | 23302 | 45 |
| 2 | 20560 | 51 |
| 3 | 18396 | 57 |
| 4 | 16384 | 64 |
| 5 | 14564 | 72 |

One suitable simplified quantization technique reduces the precision of the above forward quantization by eight bits while maintaining the same inverse quantization of HEVC. In this simplified quantization technique, forward quantization is implemented as level=(coeff*$Q\_prop$+offset)>>(6+QP/6)

where level is the quantization index, coeff is the value of transformed residual, QP is the quantization parameter, $Q\_prop$ is a constant (with reduced precision over the original Q) that depends on the value of QP (see Table 3) and offset is a fixed value added during forward quantization. The offset is the same as in HEVC scaled to 6-bit precision. Inverse quantization is implemented as coeffQ=(level*IQ<<(QP/6))>>6 where coeffQ is the quantized value of the transformed residual, level is the quantization index, QP is the quantization parameter, and IQ is a constant that depends on value of QP (see Table 3). The transformed block is assumed to be normalized before quantization.

TABLE 3

| Qp | Quantization multiplier Current values (Q) | Inverse quantization multiplier Current values (IQ) |
|---|---|---|
| 0 | 26214 | 40 |
| 1 | 23302 | 45 |
| 2 | 20560 | 51 |
| 3 | 18396 | 57 |
| 4 | 16384 | 64 |
| 5 | 14564 | 72 |

Another suitable simplified quantization technique replaces the quantization operations of the quantization specified by HEVC with shift and add/subtract operations such that multiplication operations are eliminated. The shift-based forward quantization for each QP value is implemented as QP 0: $Xq'=X/0.625=X*1.6 \sim (X+X>>1+X>>4+X>>5)$ QP 1: $Xq'=X/0.703=X*1.422 \sim (X+X>>2+X>>3+X>>5+X>>6)$ QP 2: $Xq'=X/0.796=X*1.2548 \sim (X+X>>2)$ QP 3: $Xq'=X/0.89=X*1.1235 \sim (X+X>>3)$ QP 4: $Xq'=X/1=X*1 \sim (X)$ QP 5: $Xq'=X/1.124=X*0.8896 \sim (X>>1+X>>2+X>>3+X>>6)$ where quantization is given by $Xq=(Xq'+\text{offset})>>(QP/6)$.

The shift-based inverse quantization for each QP value is implemented as

QP 0: $Xiq'=Xq*0.625 \sim (Xq>>1+Xq>>3)$

QP 1: $Xiq'=Xq*0.703 \sim (Xq>>1+Xq>>3+Xq>>4+Xq>>6)$

QP 2: $Xiq'=Xq*0.796 \sim (Xq>>1+Xq>>2+Xq>>5+Xq>>6)$

QP 3: $Xiq'=Xq*0.89 \sim (Xq>>1+Xq>>2+Xq>>3+Xq>>6)$

QP 4: $Xiq'=Xq*1 \sim (Xq)$

QP 5: $Xiq'=Xq*1.124 \sim (Xq+Xq>>3)$ where inverse quantization is given by $Xiq=(Xiq')<<(QP/6)$. In the above equations, X is the forward transformed coefficient, Xq' is the intermediate quantized coefficient, Xq is the quantized coefficient, Xiq' is the intermediate inverse-quantized coefficient, and Xiq is the inverse-quantized coefficient.

Another suitable simplified quantization technique models all quantization operations with left and right shifts, thus eliminating multiplication, addition, and subtraction. In this technique, coarse quantization is performed by rounding all quantization parameters to the nearest multiple of 2, forward quantization is implemented as $Xq=(X>>\text{shift}+\text{offset})>>(QP/6)$, and inverse quantization is implemented as $Xiq=(Xq)<<(QP/6)$ where shift is defined as follows:

Qp=0 to 5, shift=0

Qp=6 to 11, shift=1

Qp=12 to 17, shift=2

Qp=18 to 23, shift=3

Qp=24 to 29, shift=4

Qp=30 to 35, shift=5

Qp=36 to 41, shift=6

Qp=42 to 47, shift=7

Qp 48 to 51, shift=8.

Referring again to the method of FIGS. 9A and 9B, as previously described, an LCU may be partitioned into CUs using recursive quadtree partitioning. IPE is performed for each possible PU size in the quadtree partitioning. In the partitioning, assuming a 64×64 LCU with an 8×8 SCU, parent blocks (CUs) may be 64×64, 32×32, 16×16, and 8×8. Each parent CU includes 4 smaller equal sized blocks that are processed for IPE in zigzag scan order. Thus, the 64×64 LCU includes four 32×32 blocks, each 32×32 block contains four 16×16 blocks, each 16×16 block contains four 8×8 blocks, and each 8×8 block contain four 4×4 blocks.

In general, IPE is performed in bottom-up zigzag scan order in the quadtree hierarchy. For example, referring to the example of FIGS. 2A-2D, the 64×64 LCU is divided into four 32×32 blocks A, B, C, D (FIG. 2A) and IPE is performed on these blocks in zigzag scan order. To perform IPE on a 32×32 block, the 32×32 block is divided into four 16×16 blocks and IPE is performed on the 16×16 blocks in zigzag scan order. For example, block A is divided into four 16×16 blocks A1, A2, A3, A4 (FIG. 2B) and IPE is performed on each of A1, A2, A3, A4. To perform IPE on a 16×16 block, the 16×16 block is divided into four 8×8 blocks and IPE is performed on the 8×8 blocks in zigzag scan order. For example, block A1 is divided into four 8×8 blocks A11, A12, A13, A14 (FIG. 2C) and IPE is performed on each of A11, A12, A13, A14. To perform IPE on an 8×8 block, the 8×8 block is divided into four 4×4 blocks and IPE is performed on the 4×4 blocks in zigzag scan order. For example, block A11 is divided into four 4×4 blocks A111, A112, A113, A114 (FIG. 2D) and IPE is performed on each of A111, A112, A113, A114. As will be understood from the method description, as IPE is performed on blocks of the LCU, approximate reconstructed samples are stored for use in IPE of neighboring blocks in the LCU.

Referring again to FIGS. 9A and 9B, given the assumption of a 64×64 LCU and zigzag scan order, the IPE process begins with the 8×8 block at the upper left corner of the LCU (block A11 of FIG. 2C). The current 8×8 block is divided 900 into four 4×4 blocks (A111, A112, A113, A114 of FIG. 2D) and IPE with approximate reconstruction is performed 902-906 on each of the four 4×4 blocks in zigzag scan order. That is, for each 4×4 block, IPE is performed 902 to select the best intra-prediction mode of the 35 modes for the block. Once the best intra-prediction mode is selected for a 4×4 block, approximate reconstruction is applied 904 to the 4×4 block using the selected mode for intra-prediction. The approximately reconstructed block is stored for use in IPE of neighboring blocks. As previously mentioned, any suitable simplified transform and quantization may be used. In some embodiments, the previously described simplified 4×4 transform derived from the 4×4 DCT is used for the approximate reconstruction. In some embodiments, the previously described 4×4 Hadamard transform is used for the approximate reconstruction.

For simplicity of explanation, it is assumed that either reconstructed or approximate reconstructed samples from top and left neighboring LCUs are available for IPE for blocks on the top and left boundaries of the LCU. One of ordinary skill in the art will understand suitable techniques for IPE in which reconstructed samples at LCU boundaries are not otherwise available. Thus, for block A111, IPE is performed using reconstructed and/or approximate reconstructed samples from top and left neighboring LCUs. For block A112, IPE is performed using reconstructed and/or approximate reconstructed samples from the top neighboring LCU and approximate reconstructed samples from block A111. Note that IPE of block A112 requires samples from block A113, which will not yet have been processed. Any suitable padding, including substitution of original samples, may be used to provide values for the unavailable samples from block A113. For block A113, IPE is performed using reconstructed and/or approximate reconstructed samples from the left neighboring LCU and approximate reconstructed samples from block A111. For block A114, IPE is performed using approximate reconstructed samples from blocks A111, A112, and A113. Note that IPE of block A114 requires samples from block A131, which will not yet have been processed. Any suitable padding, including substitution of original samples, may be used to provide values for the unavailable samples from block A131.

Once IPE is performed for each of the 4×4 blocks of the current 8×8 block, IPE is performed 908 on the current 8×8 block to select the best intra-prediction mode of the 35 modes for the 8×8 block. If the intra-prediction mode selected for the 8×8 block is better 910 than using the intra-prediction modes selected for the four 4×4 child blocks, then approximate reconstruction is applied 912 to the 8×8 block using the selected best mode for the 8×8 block. The approximately reconstructed 8×8 block is stored for use in IPE of neighboring blocks, replacing the samples of the approximately reconstructed 4×4 child blocks. Processing then continues with the next 8×8 block, if any 914.

As previously mentioned, any suitable simplified transform and quantization may be used for the approximate reconstruction. In some embodiments, the previously described simplified 4×4 transform derived from the 4×4 DCT is used for the approximate reconstruction. In some embodiments, the previously described 4×4 Hadamard transform is used for the approximate reconstruction. In some embodiments, the previously described simplified 8×8 transform derived from the 8×8 DCT is used for the approximate reconstruction. In some embodiments, the previously described 8×8 Hadamard transform is used for the approximate reconstruction.

If the intra-prediction mode selected for the 8×8 block is not better 910 than using the intra-prediction modes selected for the four 4×4 child blocks, then the approximate reconstructed samples for the four 4×4 child blocks remain in memory for use in IPE of neighboring blocks. Processing then continues with the next 8×8 block, if any 914.

Once IPE is performed for each 8×8 block of the current 16×16 block 900-914, IPE is performed 916 on the current 16×16 block to select the best intra-prediction mode of the 35 modes for the 16×16 block. If the intra-prediction mode selected for the 16×16 block is better 918 than using the intra-prediction modes selected for the child blocks, then approximate reconstruction is applied 920 to the 16×16 block using the selected best mode for the 16×16 block. The approximately reconstructed 16×16 block is stored for use in IPE of neighboring blocks, replacing the samples of the approximately reconstructed child blocks. Processing then continues with the next 16×16 block, if any 922.

As previously mentioned, any suitable simplified transform and quantization may be used for the approximate reconstruction. In some embodiments, the previously described simplified 4×4 transform derived from the 4×4 DCT is used for the approximate reconstruction. In some embodiments, the previously described 4×4 Hadamard transform is used for the approximate reconstruction. In some embodiments, the previously described simplified 8×8 transform derived from the 8×8 DCT is used for the approximate reconstruction. In some embodiments, the previously described 8×8 Hadamard transform is used for the approximate reconstruction.

If the intra-prediction mode selected for the 16×16 block is not better 918 than using the intra-prediction modes selected for the child blocks, then the approximate reconstructed samples for the child blocks remain in memory for use in IPE of neighboring blocks. Processing then continues with the next 16×16 block, if any 922.

Once IPE is performed for each 16×16 block of the current 32×32 block 900-922, IPE is performed 924 on the current 32×32 block to select the best intra-prediction mode of the 35 modes for the 32×32 block. If the intra-prediction mode selected for the 32×32 block is better 926 than using the intra-prediction modes selected for the child blocks, then approximate reconstruction is applied 928 to the 32×32 block using the selected best mode for the 32×32 block. The approximately reconstructed 32×32 block is stored for use in IPE of neighboring blocks, replacing the samples of the approximately reconstructed child blocks. Processing then continues with the next 32×32 block, if any 930.

As previously mentioned, any suitable simplified transform and quantization may be used for the approximate reconstruction. In some embodiments, the previously described simplified 4×4 transform derived from the 4×4 DCT is used for the approximate reconstruction. In some embodiments, the previously described 4×4 Hadamard transform is used for the approximate reconstruction. In some embodiments, the previously described simplified 8×8 transform derived from the 8×8 DCT is used for the approximate reconstruction. In some embodiments, the previously described 8×8 Hadamard transform is used for the approximate reconstruction.

If the intra-prediction mode selected for the 32×32 block is not better 926 than using the intra-prediction modes selected for the child blocks, then the approximate reconstructed samples for the child blocks remain in memory for use in IPE of neighboring blocks. Processing then continues with the next 32×32 block, if any 930.

Once IPE is performed for each 32×32 block of the LCU 900-930, IPE is performed 932 on the LCU to select the best intra-prediction mode of the 35 modes for the LCU. If the intra-prediction mode selected for the LCU is better 934 than using the intra-prediction modes selected for the child blocks, then approximate reconstruction is applied 936 to the LCU using the selected best mode for the LCU. The approximately reconstructed LCU is stored for use in IPE of neighboring blocks, replacing the samples of the approximately reconstructed child blocks. Processing then terminates.

As previously mentioned, any suitable simplified transform and quantization may be used for the approximate reconstruction. In some embodiments, the previously described simplified 4×4 transform derived from the 4×4 DCT is used for the approximate reconstruction. In some embodiments, the previously described 4×4 Hadamard transform is used for the approximate reconstruction. In some embodiments, the previously described simplified 8×8 transform derived from the 8×8 DCT is used for the approximate reconstruction. In some embodiments, the previously described 8×8 Hadamard transform is used for the approximate reconstruction.

If the intra-prediction mode selected for the LCU is not better 934 than using the intra-prediction modes selected for the child blocks, then the approximate reconstructed samples for the child blocks remain in memory for use in IPE of neighboring blocks. Processing then terminates.

Note that for interior blocks of an LCU, e.g., A142, A4, D11, some of the bottom left neighboring samples are not available, e.g., A142 requires samples from A143 for IPE, A4 requires samples from C1, and D11 requires samples from C24. In such cases, any suitable padding, including substitution of original samples, may be used to provide values for the unavailable samples.

Figure 11:
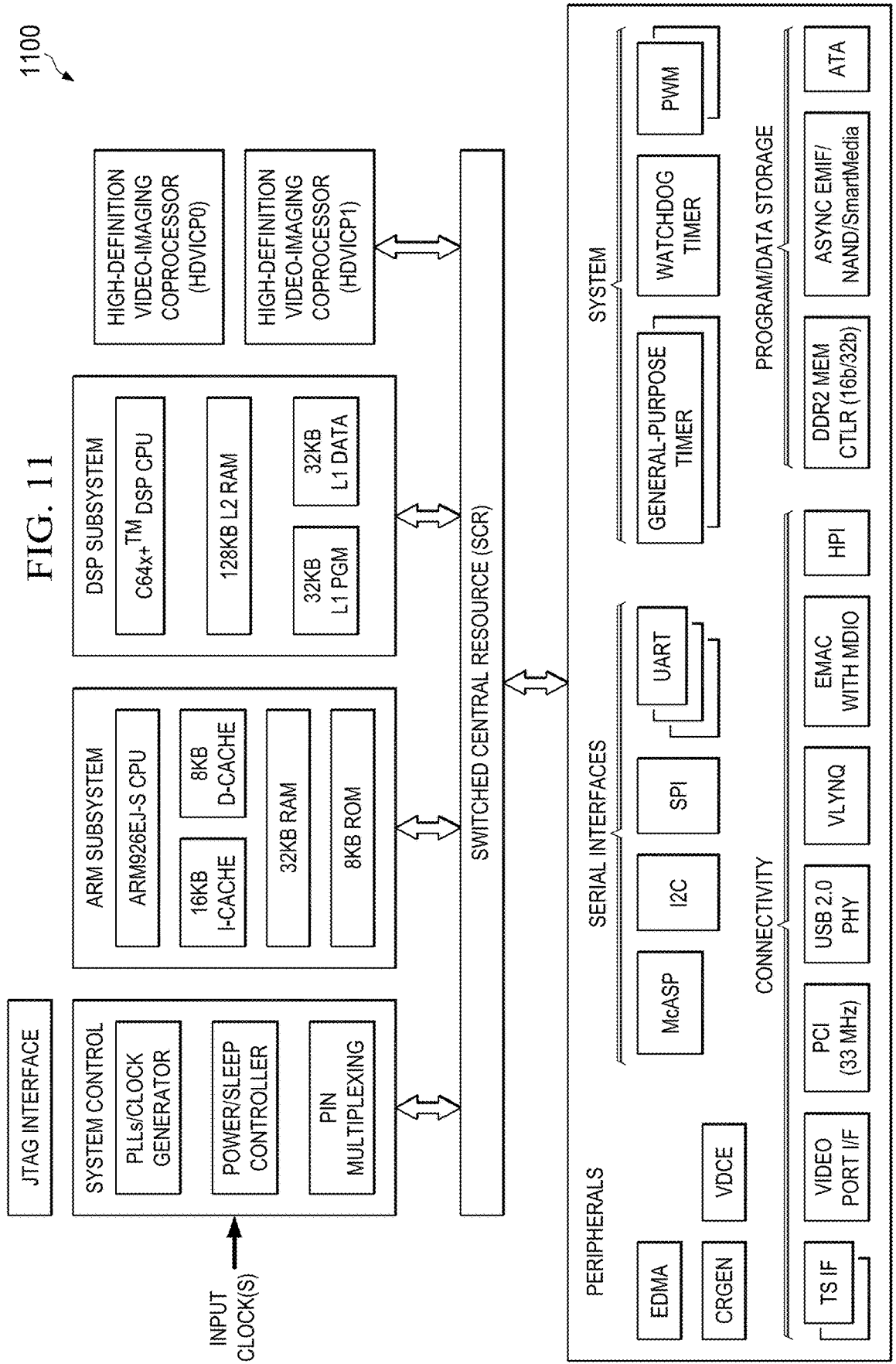
FIG. 11 is a block diagram of an illustrative digital system.

FIG. 11 is a block diagram of an example digital system suitable for use as an embedded system that may be configured to encode a video sequence using intra-prediction estimation with approximate reconstructed samples as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1100 is a programmable platform designed to meet the processing needs of applications such as video encode/decode/transcode/transrate, video surveillance, video conferencing, set-top box, medical imaging, media server, gaming, digital signage, etc. The SoC 1100 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1100 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+™ core with a very-long-instruction-word (VLIW) architecture. In general, the ARM is responsible for configuration and control of the SoC 1100, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1100 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 11, the SoC 1100 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding and/or decoding such as motion estimation, motion compensation, intra-prediction, transformation, inverse transformation, quantization, and inverse quantization. Further, the distinct circuitry in the HDVICP coprocessors that may be used for specific computation operations is designed to operate in a pipeline fashion under the control of the ARM subsystem and/or the DSP subsystem. One of ordinary skill in the art will understand modification to this circuitry to perform computation operations for intra-prediction estimation using approximate reconstructed samples as described herein.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein using the angles and angular intra-prediction modes defined in HEVC Draft 8. One of ordinary skill in the art will understand embodiments in which the prediction angles may differ, the number of prediction angles may differ, and or the particular modes considers may vary based on PU size.

In another example, embodiments have been described herein referring to block based angular intra-prediction. One of ordinary skill in the art will understand that methods described herein may also be used for IPE in which sample based intra-prediction (SAP) is used. In general, for SAP, a predicted sample for a sample in a PU is generated by linear interpolation of two reference samples adjacent to the sample. The two adjacent samples are selected according to the intra-prediction angle. Depending on the location of the sample, a reference (reconstructed) sample may be an adjacent sample in the PU or may be an adjacent reconstructed or approximate reconstructed sample from a top or left neighboring PU. Sample based intra-prediction is described, for example, in United States Patent Publication No. 2013/0101036, filed Oct. 23, 2012, which is incorporated by reference herein.

In another example, one of ordinary skill in the art will understand embodiments for other color spaces such as, for example, YUV422, YUV444, and RGB. Further, one of ordinary skill in the art will understand embodiments in which block sizes other than those used for exemplary purposes herein are used.

Embodiments of the methods and encoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

The invention claimed is:

1. A method comprising:
selecting, by at least one processor and based on a coding cost, an intra-prediction mode for each of one or more blocks of a coding unit of a picture by:
beginning with a smallest possible coding unit partitioning for the picture and progressing hierarchically through successively larger coding unit partitioning sizes of the picture until a largest possible coding unit partitioning of the picture is reached, determining an intra-prediction coding cost for the coding unit, determining a prediction unit partition type for the coding unit, and determining the intra-prediction mode for each prediction unit of the prediction unit partition type for the coding unit: and
performing, by the at least one processor, an approximate reconstruction of each of the blocks of the coding unit using the intra-prediction mode selected for that block and using, for at least one of the blocks, approximate reconstructed samples from another block of a coding unit of the picture, to produce a block of approximate reconstructed samples for the coding unit comprising:
applying a simplified transform to residual sample values of the block to generate a block of transform coefficients;
applying simplified quantization to the block of transform coefficients, to generate a block of quantized transform coefficients;
applying inverse quantization to the block of quantized transform coefficients, to recover a recovered block of transform coefficients;
applying an inverse of the simplified transform to the recovered block of transform coefficients, to generate a block of residual sample values;
adding the block of residual sample values to a corresponding block of predicted samples, to generate the block of approximate reconstructed samples; and
storing the block of approximate reconstructed samples;
wherein the simplified transform is applied to the residual sample values of the block using one or more of shift, add, and subtract operations and without using a multiplication operation.

2. The method of claim 1, further comprising:
then generating, by the at least one processor, intra-predicted residual samples for the coding unit using the selected intra-prediction mode for each block in the coding unit;
generating, by the at least one processor, transform coefficients for the coding unit based on the intra-predicted residual samples for the coding unit and using an encoding transform;
quantizing, by the at least one processor, the transform coefficients, to produce quantized transform coefficients for the coding unit; and
entropy encoding, by the at least one processor, the quantized transform coefficients for the coding unit.

3. The method of claim 1, wherein the simplified quantization comprises a quantization in which mathematical operations specified for quantization in a video coding standard are replaced by left and right shift operations and is performed without a multiplication operation.

4. The method of claim 1, wherein the simplified transform is derived from a discrete cosine transform (DCT) by multiplication of coefficients of DCT basis vectors by a constant and applying a floor function to the multiplied coefficients.

5. The method of claim 1, wherein determining the prediction unit partition type for the coding unit includes testing each possible prediction unit of the coding unit according to an intra-prediction mode specified for a prediction unit of a given size.

6. A device comprising:
at least one processor; and
a non-transitory computer readable storage medium storing a program for execution by the at least one processor, the program including instructions to cause the at least one processor to:
select, based on a coding cost, an intra-prediction mode for each of one or more blocks of a coding unit of a picture by:
beginning with a smallest possible coding unit partitioning for the picture and progressing hierarchically through successively larger coding unit partitioning sizes of the picture until a largest possible coding unit partitioning of the picture is reached, determining an intra-prediction coding cost for the coding unit, determining a prediction unit partition type for the coding unit, and determining the intra-prediction mode for each prediction unit of the prediction unit partition type for the coding unit; and perform approximate reconstruction for each of the blocks using the intra-prediction mode selected for that block and using, for at least one of the blocks, approximate reconstructed samples from another block of a coding unit of the picture, to produce a block of approximate reconstructed samples for the coding unit by a plurality of operations comprising:
applying a simplified transform to residual sample values of the block to generate a block of transform coefficients;
applying simplified quantization to the block of transform coefficients, to generate a block of quantized transform coefficients;
applying inverse quantization to the block of quantized transform coefficients, to recover a recovered block of transform coefficients;
applying an inverse of the simplified transform to the recovered block of transform coefficients, to generate a block of residual sample values;
adding the block of residual sample values to a corresponding block of predicted samples, to generate the block of approximate reconstructed samples; and
storing the block of approximate reconstructed samples;
wherein the simplified transform is applied to the residual sample values of the block using one or more of shift, add, and subtract operations and without using a multiplication operation.

7. The device of claim 6, wherein the program further includes instructions to cause the at least one processor to:
then generate intra-predicted residual samples for the coding unit using the selected intra-prediction mode for each block in the coding unit;
generate transform coefficients for the coding unit based on the intra-predicted residual samples for the coding unit and using an encoding transform;
quantize the transform coefficients, to produce quantized transform coefficients for the coding unit; and
entropy encode the quantized transform coefficients for the coding unit.

8. The device of claim 6, wherein the simplified quantization comprises a quantization in which mathematical operations specified for quantization in a video coding standard are replaced by left and right shift operations and is performed without a multiplication operation.

9. The device of claim 1, wherein the simplified transform is derived from a discrete cosine transform (DCT) by multiplication of coefficients of DCT basis vectors by a constant and applying a floor function to the multiplied coefficients.

10. A non-transitory computer readable storage medium storing a program for execution by at least one processor, the program including instructions to cause the at least one processor to:
select, based on a coding cost, an intra-prediction mode for each of one or more blocks of a coding unit of a picture by:
beginning with a smallest possible coding unit partitioning for the picture and progressing hierarchically through successively larger coding unit partitioning sizes of the picture until a largest possible coding unit partitioning of the picture is reached, determining an intra-prediction coding cost for the coding unit, determining a prediction unit partition type for the coding unit, and determining the intra-prediction mode for each prediction unit of the prediction unit partition type for the coding unit; and perform approximate reconstruction to each of the blocks using the selected intra-prediction mode for that block and using, for at least one of the blocks, approximate reconstructed samples from another block of a coding unit of the picture, to produce a block of approximate reconstructed samples for the coding unit by a plurality of operations comprising:
applying a simplified transform to residual sample values of the first block of samples, to generate a block of transform coefficients;
applying simplified quantization to the block of transform coefficients, to generate a block of quantized transform coefficients;
applying inverse quantization to the block of quantized transform coefficients, to recover a recovered block of transform coefficients;
applying an inverse of the simplified transform to the recovered block of transform coefficients, to generate a block of residual sample values;
adding the block of residual sample values to a corresponding block of predicted samples, to generate the block of approximate reconstructed samples; and
storing the block of approximate reconstructed samples;
wherein the simplified transform is applied to the residual sample values of the block using one or more of shift, add, and subtract operations and without using a multiplication operation.

11. The non-transitory computer readable storage medium of claim 10, the program further including instructions to cause the at least one processor to:
then generate intra-predicted residual samples for the coding unit using the selected intra-prediction mode for each block in the coding unit;
generate transform coefficients for the coding unit based on the intra-predicted residual samples for the coding unit and using an encoding transform;
quantize the transform coefficients, to produce a quantized transform coefficients for the coding unit; and
entropy encode the quantized transform coefficients for the coding unit.

12. The non-transitory computer readable storage medium of claim 10, wherein the simplified quantization comprises a quantization in which mathematical operations specified for quantization in a video coding standard are replaced by left and right shift operations and is performed without a multiplication operation.

13. The non-transitory computer readable storage medium of claim 10, wherein the simplified transform is derived from a discrete cosine transform (DCT) by multiplication of coefficients of DCT basis vectors by a constant and applying a floor function to the multiplied coefficients.

* * * * *